(12) United States Patent
de Jong et al.

(10) Patent No.: US 6,785,460 B2
(45) Date of Patent: Aug. 31, 2004

(54) TOOL TO REMOVE A FERRULE FROM A RECEPTACLE

(75) Inventors: Michael de Jong, Ft. Worth, TX (US); Stuart R. Melton, Hickory, NC (US); Charles A. Yow, Jr., Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/306,128

(22) Filed: Nov. 27, 2002

(65) Prior Publication Data

US 2004/0101265 A1 May 27, 2004

(51) Int. Cl.[7] .................................................. G02B 6/00
(52) U.S. Cl. ....................................................... 385/134
(58) Field of Search .................. 29/763–764; 439/352; 385/53–59, 60–62, 77–78, 81–86, 134–136

(56) References Cited

U.S. PATENT DOCUMENTS

| | | | |
|---|---|---|---|
| 3,951,514 A | * | 4/1976 | Medina, Jr. .................. 385/55 |
| 4,155,159 A | * | 5/1979 | Hogan et al. .................. 29/764 |
| 5,414,790 A | * | 5/1995 | Lee et al. .................... 385/139 |
| 5,774,611 A | | 6/1998 | Nagase et al. ................ 385/58 |
| 5,971,626 A | | 10/1999 | Knodell et al. ............... 385/60 |
| 2003/0152332 A1 | * | 8/2003 | Kao ............................ 385/78 |

OTHER PUBLICATIONS

Patent Abstract of Japan, 08248263A, Sep. 27, 1996, 1 page.

* cited by examiner

*Primary Examiner*—Khiem Nguyen

(57) ABSTRACT

A tool is provided for removing a ferrule from a receptacle that includes a handle portion having a distal end and a proximal end and a ferrule engagement portion disposed at the distal end of the handle portion. The tool also includes a latch disengagement portion disposed at the distal end of the handle portion. The tool handle may be angled for easier access if the receptacle is attached to a printed circuit board. Additionally, the tool may include an optical fiber opening to prevent the optical fibers from being bent or damaged during the ferrule removal.

16 Claims, 16 Drawing Sheets

TOOL TO REMOVE A FERRULE FROM A RECEPTACLE

The present invention relates to a tool to remove a ferrule from a receptacle for receiving and securing an optical fiber ferrule that is in optical communication with an optical component.

Typically in the telecommunications industry, when devices using optical fibers are to be connected to one another or there needs to be flexibility in the routing of optical fibers, fiber optic connectors are used to perform the connections. The fiber optic connectors can be relatively large, bulky, and somewhat complex in the number of components and construction. With the recent proliferation of optical components, more and more fiber optic connections are being installed. Some of these connections are used in areas that have very little space, are difficult to access, or do not need the security and ruggedness that fiber optic connectors provide. For example, certain connections are in areas that once a connector is installed, it will not be removed or accessed. Such connections do not require a full-sized connector due to space, access, or monetary constraints.

There are several prior art receptacles including, for example, a device disclosed in U.S. Pat. No. 5,971,626, which discloses a connector and connector sleeve assembly comprising a connector with reduced parts that is received in one side of the connector sleeve. However, that sleeve and connector are used only in conjunction with reduced parts—a stripped-down connector and not an optical fiber ferrule. Additionally, the telecommunications industry is requiring higher densities of optical fibers in the ferrules, thereby necessitating the use of multi-fiber ferrules. However, the receptacle and ferrule in the reference is directed to a cylindrical ferrule and therefore has a limited number of optical fibers. Moreover, since it is a reduced-part connector, the operator can remove the connector by using fingers.

Similarly, Japanese Publication Number 08-248263 is directed to an optical receptacle for a cylindrical connector. The receptacle has flanges that engage a rear side of a set of prisms or surfaces attached to the ferrule. Therefore, this reference is also directed to a reduced-part connector, or something more than just a ferrule. The reduced-part connector is removed by rotating it 45° to move the flanges out of the way of the prisms or surfaces. Again, the ferrule in the connector is cylindrical and cannot accommodate the increasing number of optical fibers needed in the telecommunication industry today.

Accordingly, the present invention is directed to a tool for removing a ferrule from receptacle that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a tool for removing a ferrule from a receptacle that includes a handle portion having a distal end and a proximal end, a ferrule engagement portion disposed at the distal end of the handle portion, and a latch disengagement portion disposed at the distal end of the handle portion.

In another aspect, the invention provides for a tool for removing a ferrule from a receptacle that includes a handle portion having a distal end and a proximal end, a ferrule engagement portion disposed at the distal end of the handle portion, a latch disengagement portion disposed at the distal end of the handle portion, and an optical fiber opening extending at least partially between the proximal and distal ends of the handle portion.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention. Like numbers refer to like elements throughout.

DETAILED DESCRIPTION OF THE INVENTION

Figure 1:
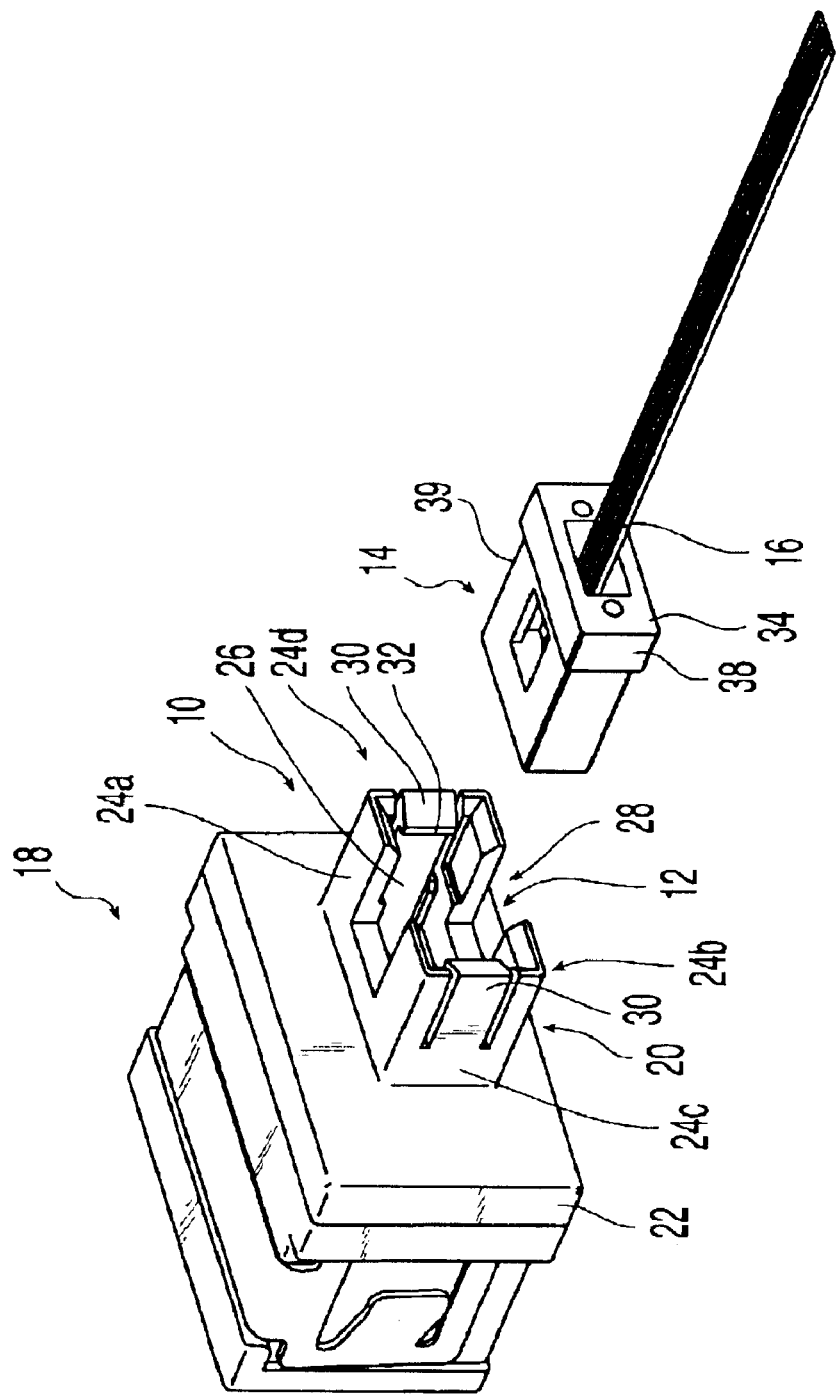
FIG. 1 is a perspective view of one embodiment of a receptacle according to the present invention.
Figure 2:
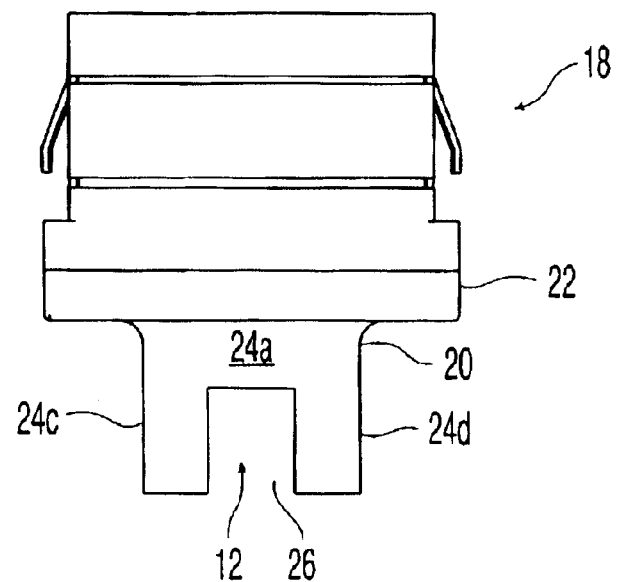
FIG. 2 is a top view of the receptacle of FIG. 1.
Figure 8:
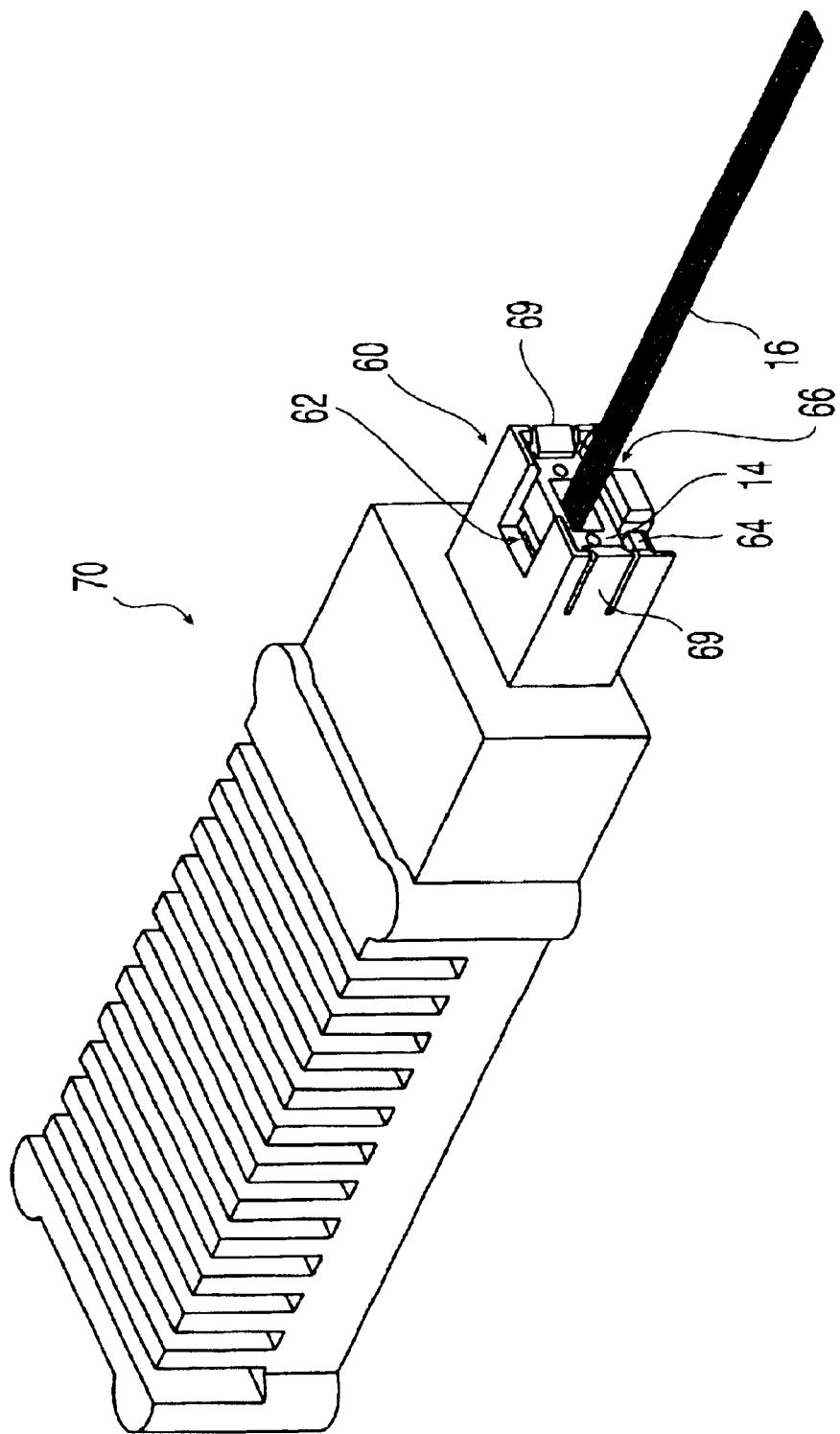
FIG. 8 is a perspective view of a third embodiment of a receptacle according the present invention.

A receptacle 10 according to the present invention is illustrated in FIG. 1. The receptacle 10 has an opening 12 for receiving a ferrule 14 with optical fibers 16. The receptacle 10 can be mounted to any one of a number of other optical components, including, for example, a fiber optic connector sleeve 18 as shown in FIG. 1. The optical components may also include any other optical devices such as a fiber optic connector, a panel for holding fiber optic connectors, an opto-electronic transmitter, a receiver, or a transceiver module. Such a module is illustrated in FIG. 8, and will be discussed in greater detail below. The opening 12 extends through the receptacle 10 to allow the ferrule 14 to be in optical communication with the optical component mounted on the rear side of the receptacle 10. Within the opening 12 are alignment members 15, which help to align the ferrule 14 with the corresponding optical component. As shown in FIGS. 1, 2, 5, and 6, one embodiment of the alignment members are ribs that are preferably disposed in the four corners of the opening 12. The ferrule 14 is guided by the ribs 15 toward the center of opening 12 to engage other aligning devices, such as guide pins associated with the optical component 18. While ribs 15 generally have a square or rectangular cross section, they could have any appropriate shape or configuration. For example, ribs 15 could have an L-shape.

Figure 3:
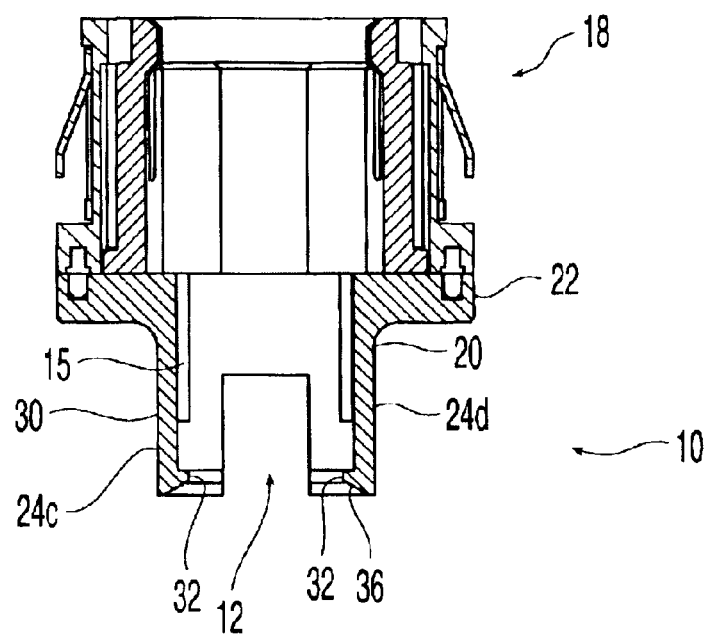
FIG. 3 is a cross section of the receptacle in FIG. 1.
Figure 4:
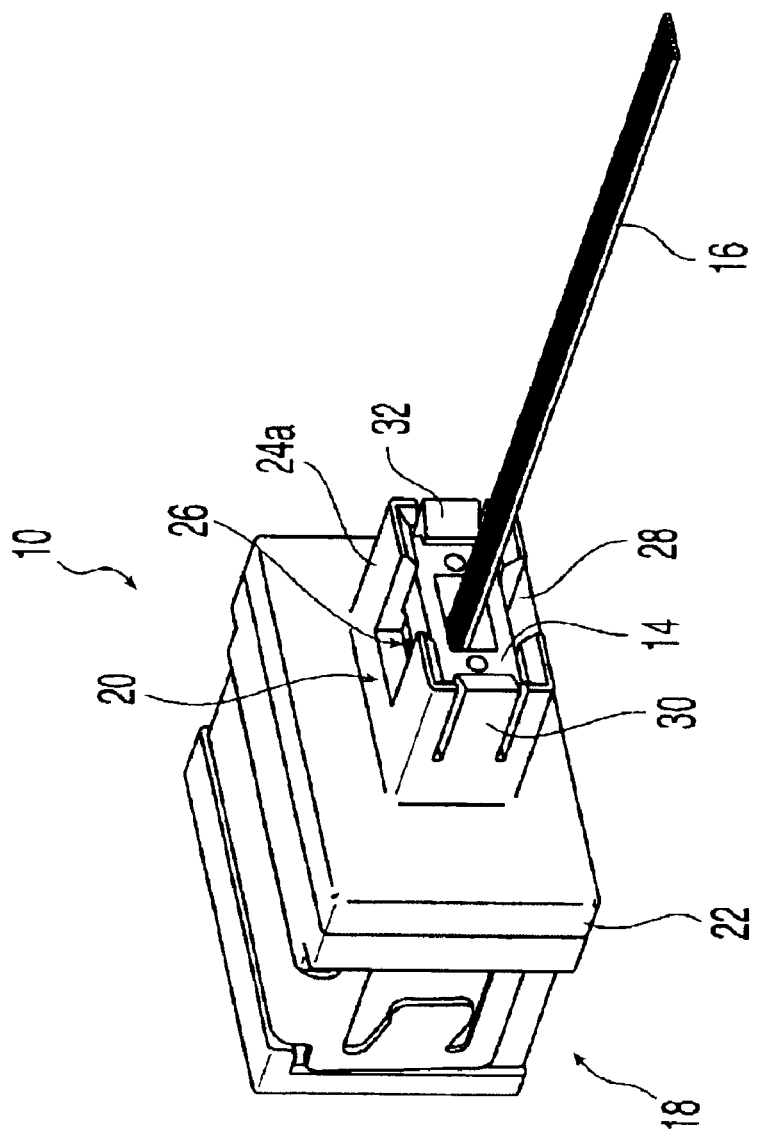
FIG. 4 illustrates a ribbonized optical ferrule positioned within the receptacle of FIG. 1.

In one embodiment of the receptacle 10, there is a forward portion 20 and a rearward portion 22. The forward portion 20 generally has a smaller cross section than the rearward portion 22. The larger rearward portion 22 allows the receptacle 10 to match the size and shape of the connector sleeve 18, but could be of any appropriate size or shape. In fact, there may not be a need for such a portion, as discussed below with respect to the receptacle of FIGS. 8 & 9. The forward portion 20 preferably has four relatively straight sides 24a–24d. Side 24a preferably has at least one opening 26 to allow access to at least a portion of the ferrule 14 on the top of the receptacle 10, as will be described in detail below. Side 24b also preferably has at least one opening 28 to allow access to at least a portion of the ferrule 14 on the bottom of the receptacle 10. In the embodiment illustrated in FIGS. 1–4, sides 24c and 24d both have at least one securing element 30 to retain ferrule 14 within the receptacle 10. As can be best seen in FIG. 3, the securing elements 30 are preferably elongated members with a latch portion 32 to engage a rearward face 34 of the ferrule 14. The securing elements 30 also have an angled surface 36, which allows for a tool to move the latch portions 32 and the securing elements 30 away from the ferrule and allow the ferrule 14 to be removed from the receptacle 10.

The ferrule 14 typically has a rearward shoulder portion 38 that has a larger cross section than the forward portion 39 of the ferrule 14. At least a portion of the rearward shoulder portion 38 of the ferrule 14 is accessible through at least one of the openings 26 and 28. See FIG. 4, where a central portion of the rearward shoulder portion 38 is visible and accessible. As indicated above, there are preferably two openings 26 and 28, one in each of the sides 24a and 24b to allow a tool 80 (FIG. 10) to grab and/or support the ferrule 14 during removal from and insertion into receptacle 10. However, as explained below with reference to other embodiments, there may only be one opening or more than one opening on any one side.

Figure 5:
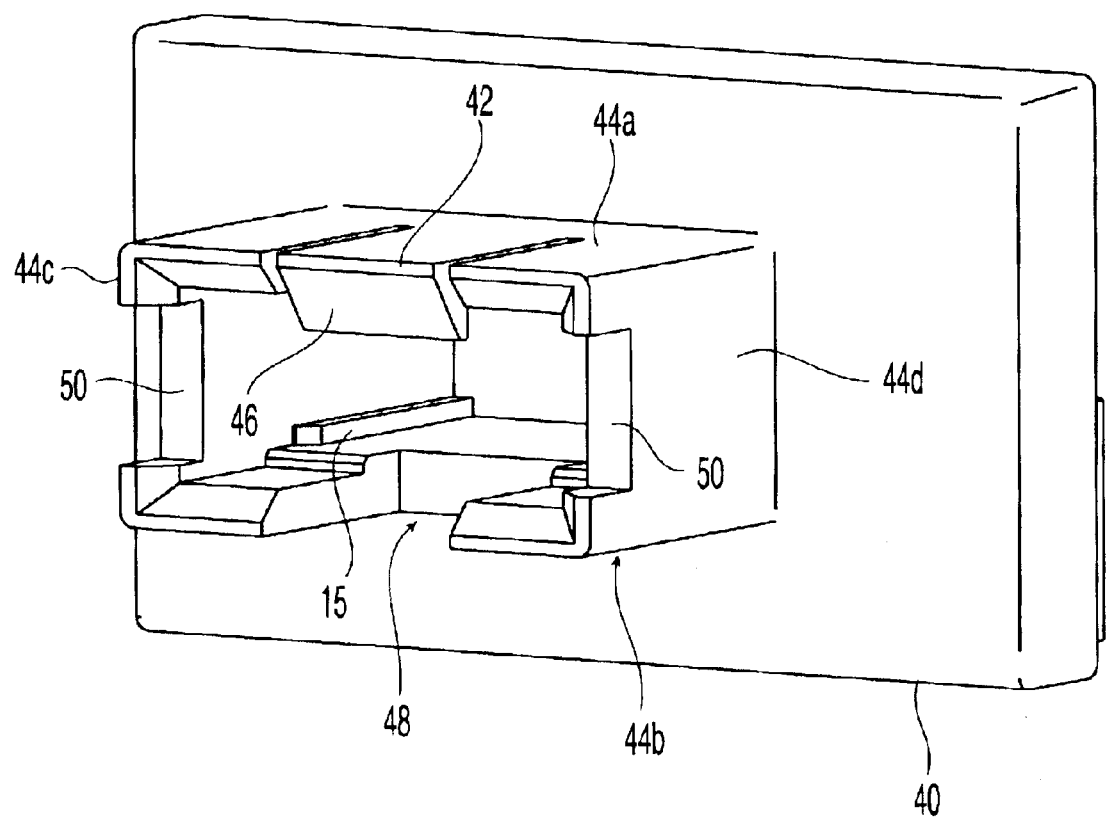
FIG. 5 is a perspective view of a second embodiment of a receptacle according to the present invention.
Figure 6:
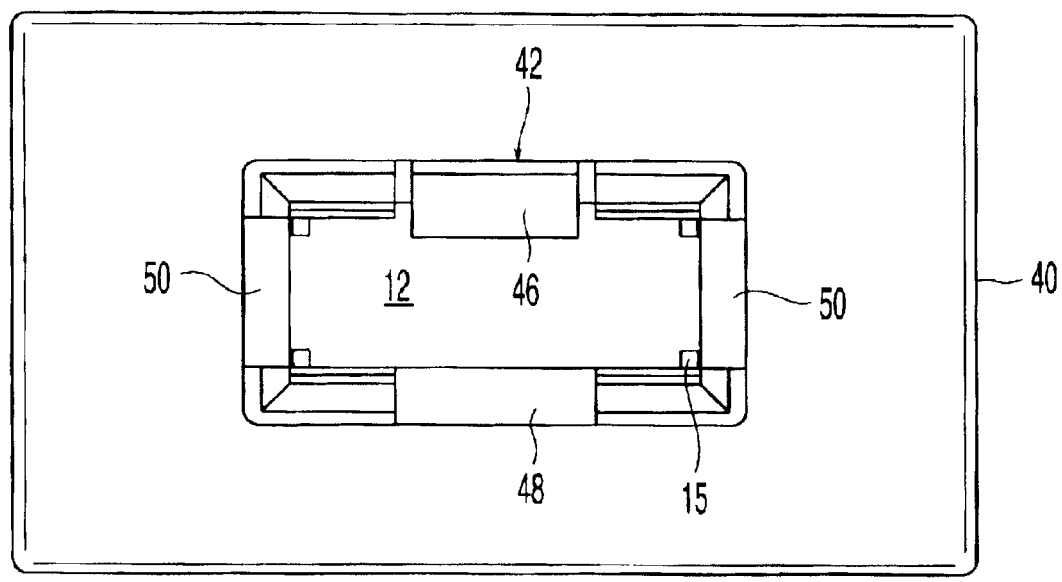
FIG. 6 is a front elevation view of the receptacle in FIG. 5.
Figure 7:
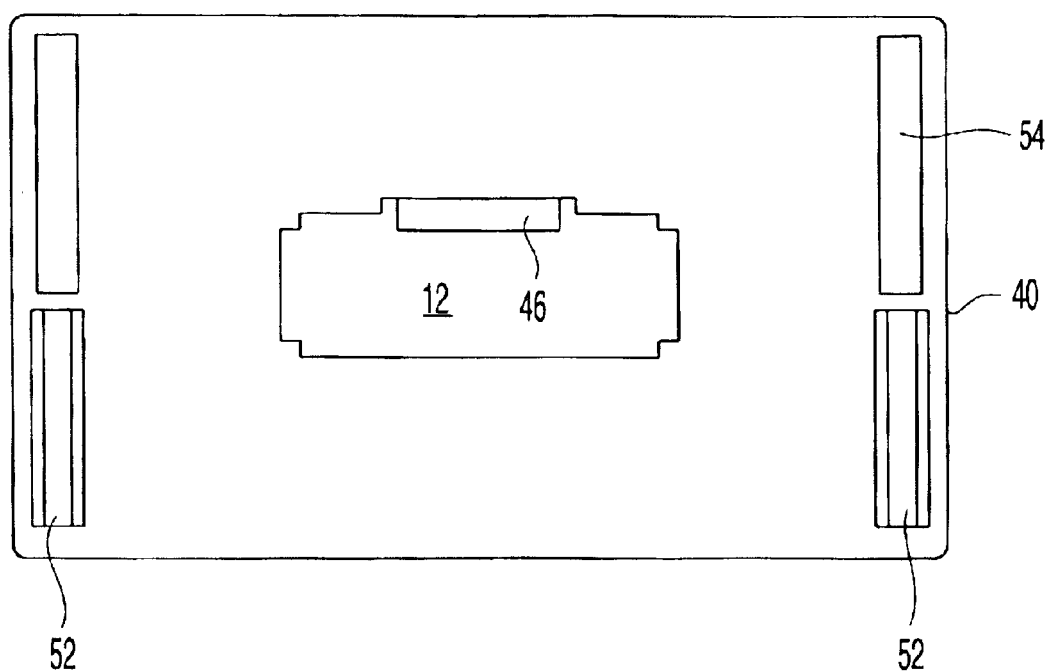
FIG. 7 is a rear elevation view of the receptacle in FIG. 5.

An alternative embodiment of the forward portion of the receptacle is shown in FIG. 5. The receptacle 40 also preferably has four relatively straight sides 44a–44d and an opening 48 in side 44b to provide access to at least a portion of ferrule 14. However, the receptacle 40 only has one securing element 42, which also has a latch portion 46 to engage the rearward face 34 of the ferrule 14. Preferably, the receptacle 40 also has an opening 50 on each of the sides 44c and 44d to provide access to a tool to provide support to the ferrule 14 during insertion and removal. As can be seen in the rear view of the receptacle in FIG. 7, the receptacles 10,40 have two protrusions 52 to engage corresponding indentations in an optical component 18. The receptacles 10,40 also have indentations 54 to receive corresponding protrusions from the optical component 18. The receptacle 10,40 can be secured to the optical component in any acceptable manner, including the use of adhesive, ultrasonic welding, solvent welding, and mechanical retention (rivets, snaps, interference or friction fits).

Figure 9:
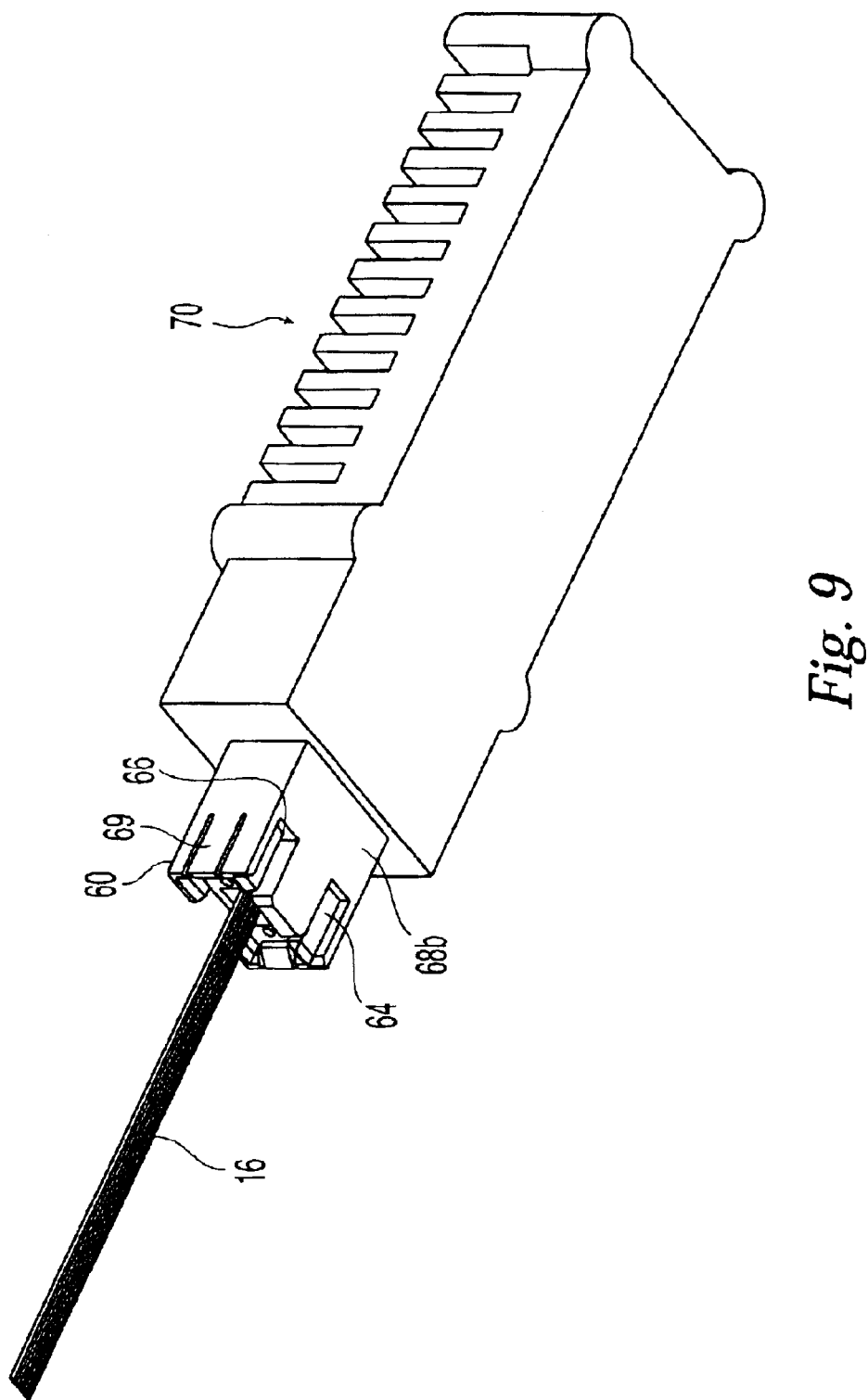
FIG. 9 is a bottom perspective view of the receptacle in FIG. 8.

Another embodiment of a receptacle 60 is illustrated in FIGS. 8 and 9. The receptacle 60 is similar to receptacles 10,40, except that receptacle 60 is mounted to an optical component 70. In addition to the opening 62 on top for access to at least a portion of the ferrule 14, this receptacle 60 has two openings 64,66 in the bottom surface 68b. See also FIG. 9. Receptacle 60, unlike the first two embodiments, does not have a forward portion and a larger rearward portion. Since the receptacle 60 does not need to match the connector sleeve 18, the receptacle 60 does not need the larger rearward portion. It should be noted that the receptacles 10,40,60 should be sized such that the front face of the ferrule 14 is in optical communication with the optical component to which the receptacle is mated.

In the illustrated embodiment of receptacle 60, the two openings 64,66 allow the insertion of a tool (described in more detail below), which supports the ferrule 14 upon insertion and removal. Typically the optical component 70 is mounted on a printed circuit board, which prevents unfettered access to the bottom surface. Therefore, two smaller openings 64,66 have been provided in the bottom side 68b, although it is possible to have a single opening as in the first embodiment. It is also possible to have the securing elements 69 on the top and bottom sides rather than on the sides. However, if receptacle 60 and optical component 70 are board-mounted, the securing elements 69 may not have sufficient space to move, preventing removal of the ferrule or causing damage to the receptacle, ferrule, or board. As noted above, while a transceiver 70 is shown, any optical component can be used.

Figure 10:
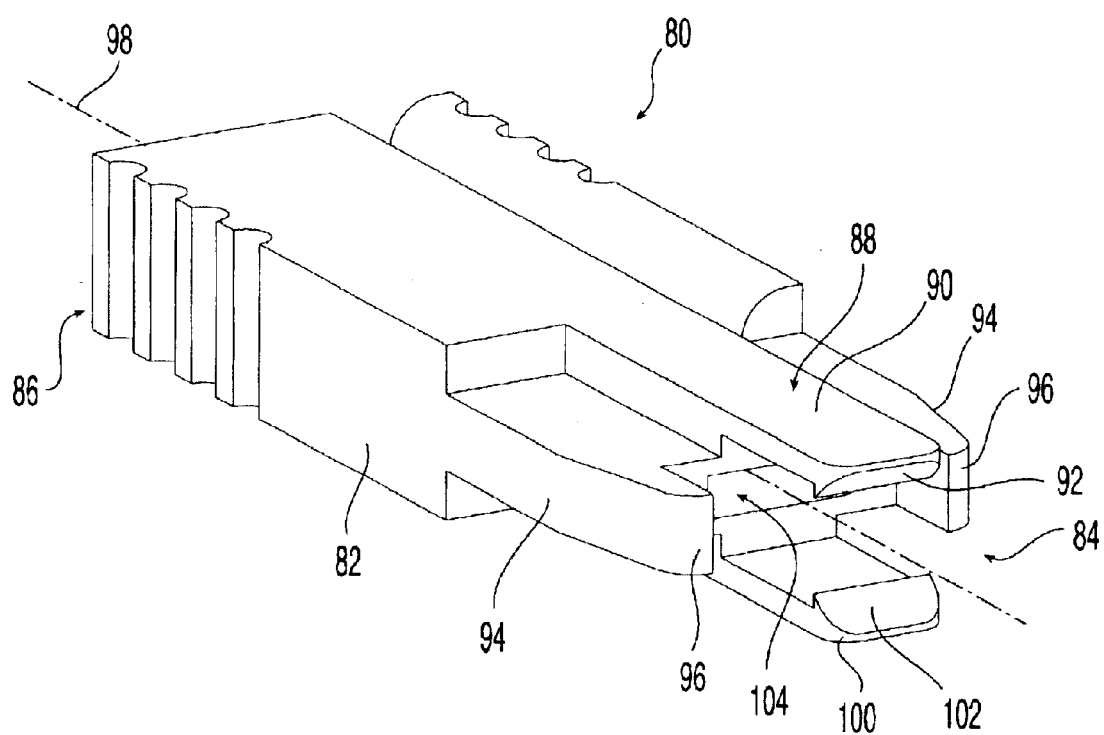
FIG. 10 is a perspective view of a tool according to one embodiment of the present invention that is used in conjunction with the receptacle of FIG. 1.

An exemplary tool 80 is illustrated in FIG. 10 for use with receptacle 10 and ferrule 14. Tool 80 has a handle portion 82 with a distal end 84 and a proximal end 86. The tool 80 has at its distal end 84 a ferrule engagement portion 88. In the embodiment shown in FIG. 10, the ferrule engagement portion 88 includes an elongated member 90 that has a projection 92 to engage the rearward shoulder portion 38 of ferrule 14. The tool 80 also has latch disengagement portions 94 on each side of the distal end 84 of the tool 80. The latch disengagement portions 94 each have an engagement surface 96, which are surfaces sloping inward toward longitudinal axis 98 of tool 80. The latch disengagement portions 94 engage the latch portions 32 of the receptacle and force them outward from the longitudinal axis 98 to release the ferrule 14. Ferrule supporting member 100 is on an opposing side of tool 80 from the ferrule engagement portion 88. In the embodiment shown in FIG. 10, the ferrule supporting member 100 also has a projection 102 to engage the shoulder portion 38 of ferrule 14 as does ferrule engagement portion 88. However, the ferrule supporting member 100 does not need to have a projection (see, e.g., the tool 110 in FIG. 14), but could instead be a flat surface or have any other configuration to support the ferrule 14.

Tool 80 also has an optical fiber opening 104 for the optical fibers 16 that extend from the rearward face 34 of the ferrule 14. The optical fibers have a minimum bend radius that must not be exceeded and the optical fiber opening 104, which extends from the distal end 84 to the proximal end 86, allows the optical fibers to maintain a relatively straight line during insertion and removal of the ferrule 14. In the tool 80, the optical fiber opening 104 generally lies along the longitudinal axis 98 and extends out the proximal end 86 of tool 10.

Figure 12:
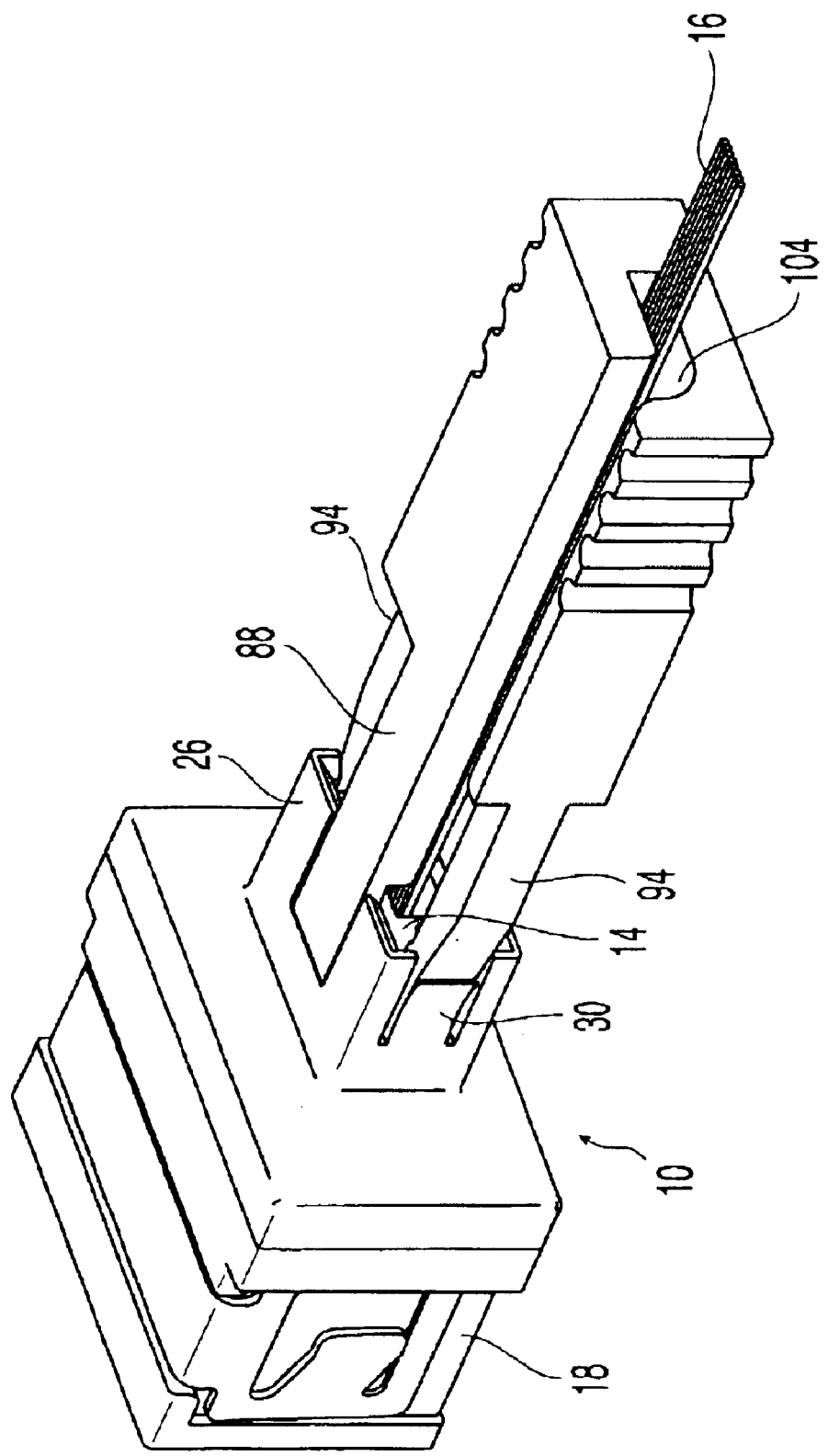
FIG. 12 is perspective view of the tool of FIG. 11 engaging the receptacle.
Figure 13:
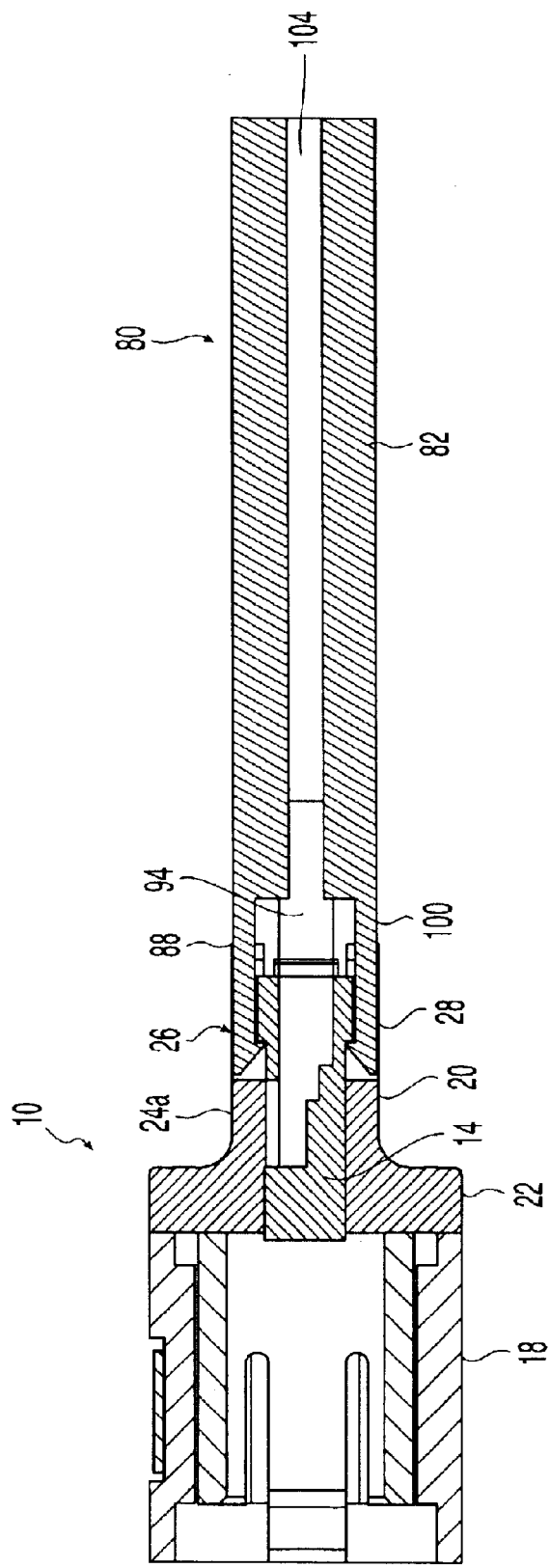
FIG. 13 is a cross section of the receptacle, tool, and ferrule of FIG. 12.

The use of tool 80 will now be described in conjunction with FIGS. 11–13. Tool 80 is shown with the ferrule engagement portion 88 and the ferrule supporting member 100 engaging ferrule 14 on the top and bottom. The latch disengagement portions 94 also provide lateral support to the ferrule, while also opening the securing elements 30. The optical fibers 16 are routed through the optical fiber opening 104.

To insert the ferrule 14 into the receptacle 10, the ferrule engagement portion 88 and ferrule supporting member 100 are aligned with respective openings 26 and 28 as the ferrule 14 is inserted into opening 12. As the ferrule engagement portion 88 and ferrule supporting member 100 are inserted into openings 26 and 28, the latch disengagement portions 94, and more specifically, each engagement surface 96, engage the securing elements 30, forcing them outward to allow the ferrule to be inserted into receptacle 10. A slight up and down motion by the user as the tool 80 is pulled slightly backward will disengage the tool 80 from the ferrule 14, leaving the ferrule 14 in the receptacle 10.

Similarly, if the ferrule 14 is secured within the receptacle 10, the ferrule engagement portion 88 and ferrule supporting member 100 are inserted into openings 26 and 28, each engagement surface 96 engages the securing elements 30, forcing them outward to allow the ferrule 14 to be removed. As the latch disengagement portions 94 push the securing elements 30 outward, the ferrule engagement portion 88 slides over the rearward shoulder portion 38 of ferrule 14, allowing the tool 80 to grab hold of the ferrule 14 for removal. As can be seen in FIGS. 11 and 12, the latch disengagement portions 94 extend beyond the rearward face 34 of the ferrule 14. Thus, when the ferrule engagement portion 88 engages the ferrule 14, the securing elements 30 have been moved away from the ferrule 14, allowing it to be removed.

Figure 11:
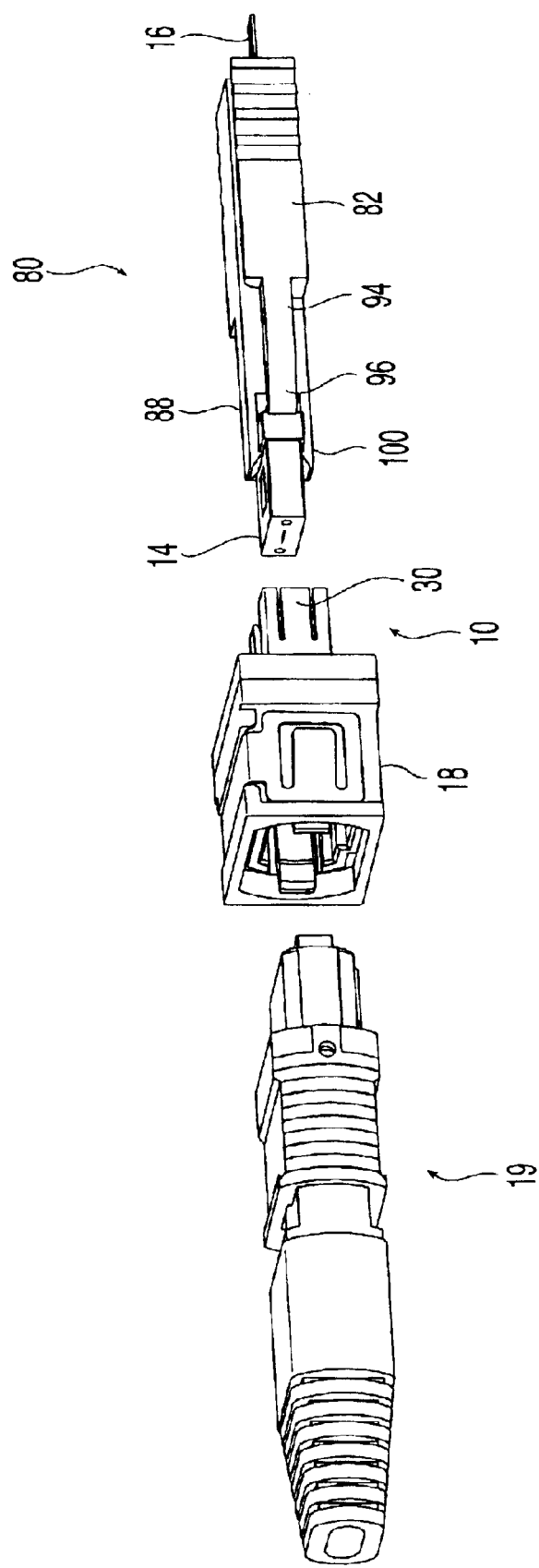
FIG. 11 is a perspective view of the receptacle of FIG. 1 with the tool holding the ferrule and also showing an optical fiber connector to be used on a second side of the receptacle.

As also illustrated in FIG. 11, a fiber optic connector 19 can be inserted into the connector sleeve 18 to optically communicate with the ferrule 14. While an MTP connector is illustrated, any type of ferrule that would optically communicate with ferrule 14 can be used, including, for example, MPO/MTP, mini MPO, MTRJ, and MPX connectors. The connector sleeve portion 18 of receptacle 10 can be modified to accept the appropriate connector.

Figure 14:
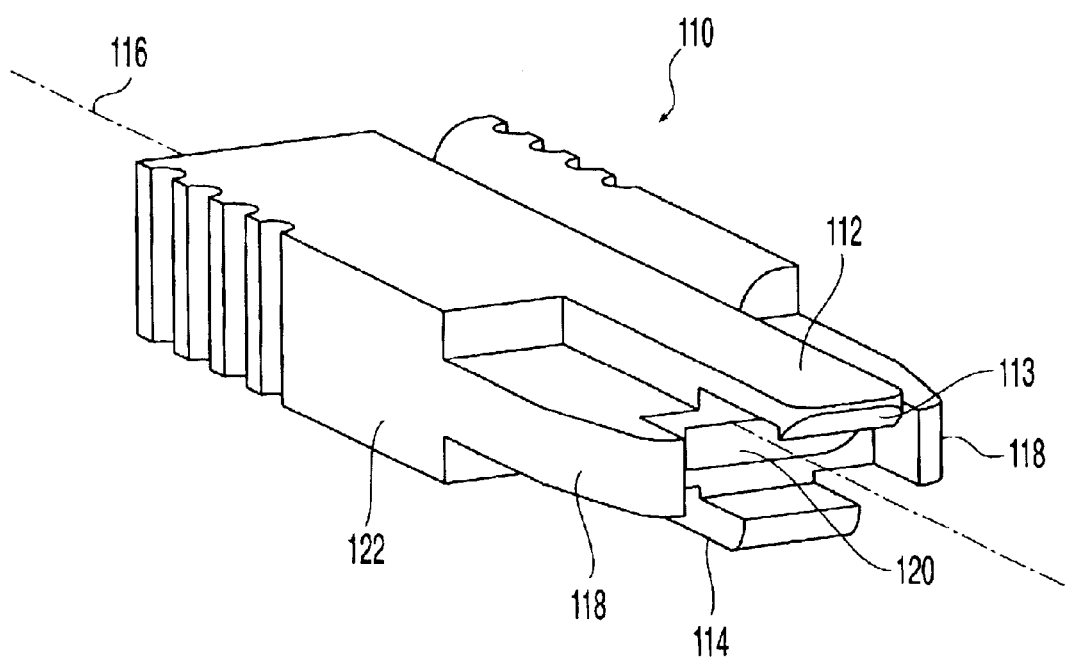
FIG. 14 is a perspective view of a second embodiment of a tool according to the present invention.

A tool 110 to be used with the receptacle 40 is illustrated in FIG. 14. The tool 110 is similar to the tool 80, but has a couple of different features due to the different arrangement of features on receptacle 40, including, for example, securing element 42, latch portion 46, and openings 50. It should be noted that the tool is rotated about axis 116 180° relative to receptacle 40 in FIG. 5 so that all features of the tool 110 are visible in FIG. 14. Ferrule engagement portion 112, which also has a latch portion 113, aligns with opening 48 to engage the ferrule 14, while ferrule supporting member/latch disengagement portion 114 aligns with securing element 42. Ferrule supporting member/latch disengagement portion 114 not only moves the securing element 42 away from the ferrule 14 during insertion and removal, but also provides some support to the ferrule 14 so that it does not fall out of the tool 110 during use. Ferrule support members 118 provide lateral support to the ferrule 14 to prevent horizontal movement of the ferrule 14 during insertion and removal. The other features of tool 110 are similar to tool 80. For example, tool 110 also has an optical fiber opening 120 for the optical fibers extending from the ferrule and a handle 122. The operation of tool 110 is similar to the operation of tool 80 and will not be repeated here.

Figure 15:
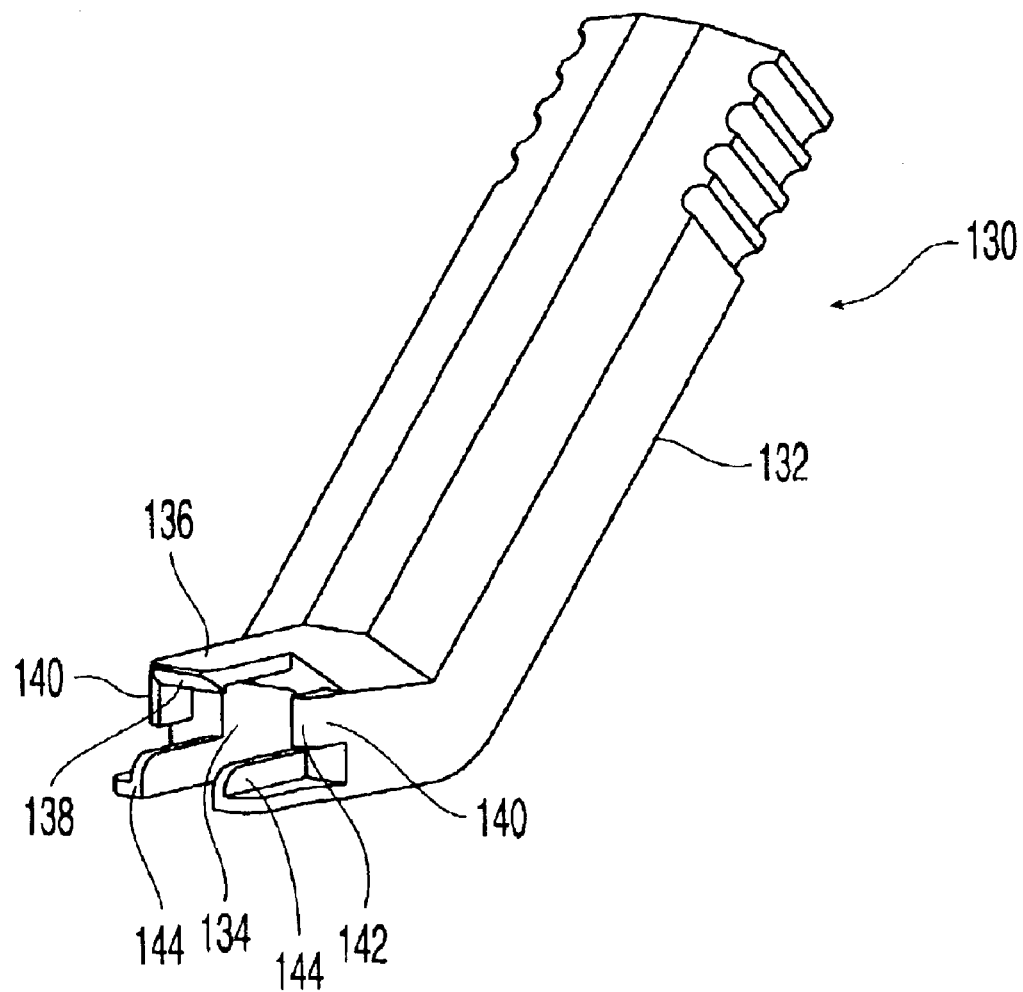
FIG. 15 is a perspective view of a third embodiment of a tool according to the present invention.
Figure 16:
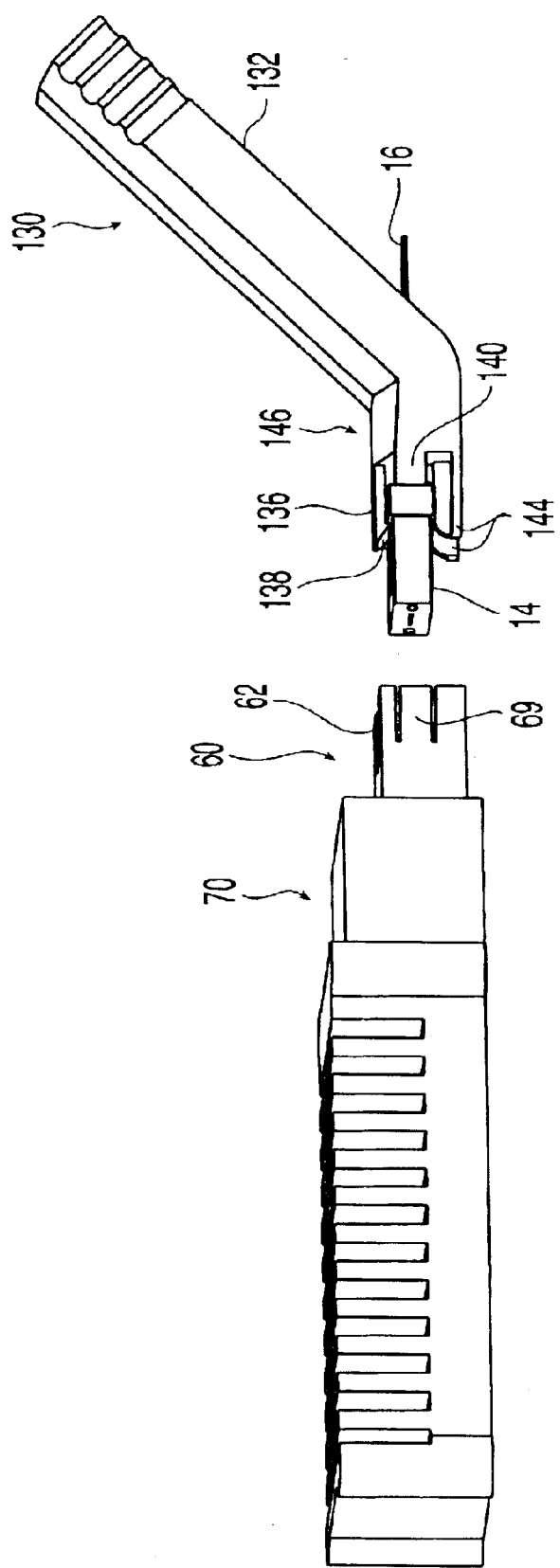
FIG. 16 is a perspective view of the receptacle of FIG. 8 with the tool of FIG. 15 holding a ferrule.
Figure 17:
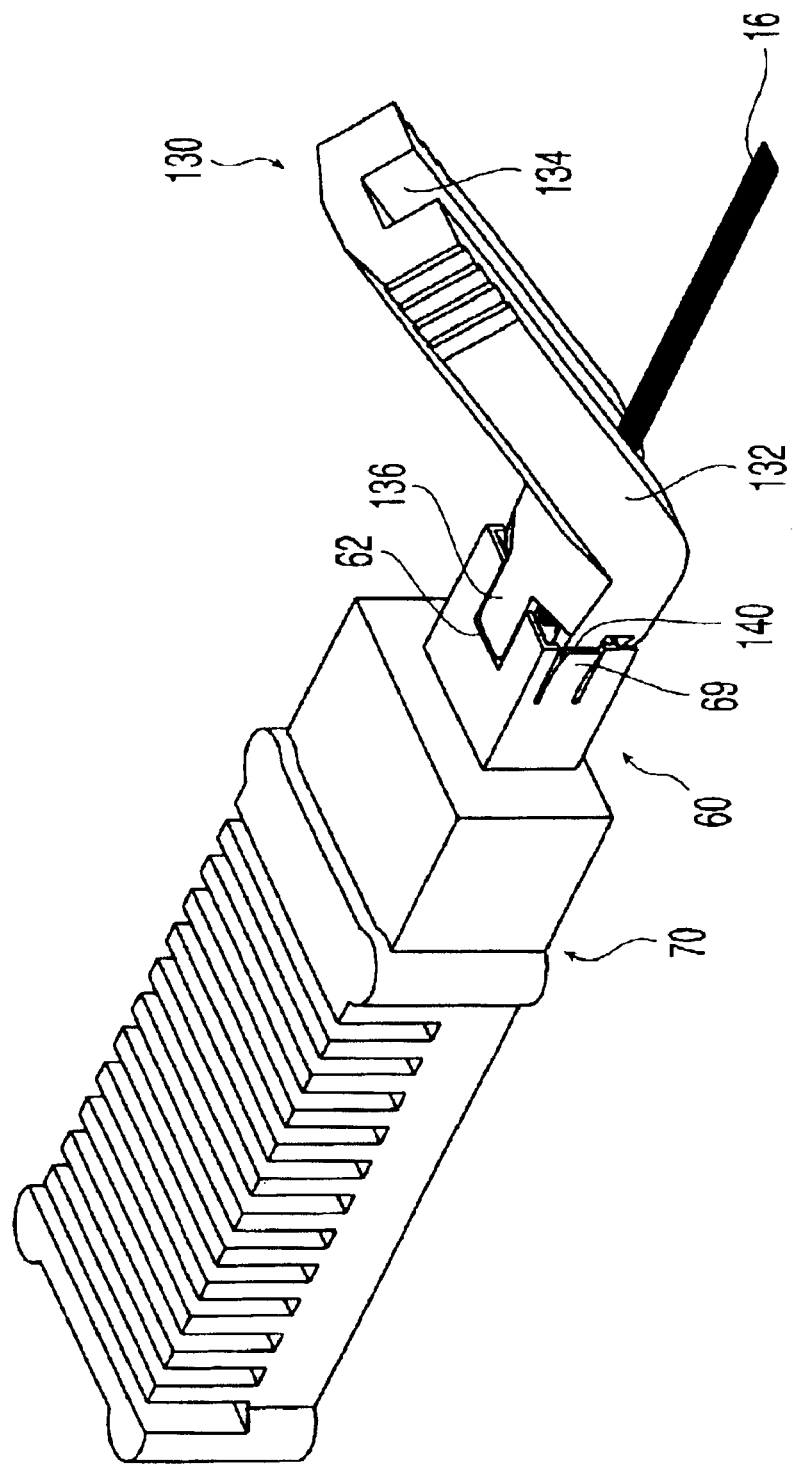
FIG. 17 is a top perspective view of the receptacle, tool, and ferrule of FIG. 16.

Another embodiment of a tool 130 is illustrated in FIGS. 15–17, and is preferably used with receptacle 60. The tool 130 has a handle 132, an optical fiber opening 134, a ferrule engagement portion 136 with a projection 138 to engage the ferrule 14, two latch disengagement portions 140, each with an engagement surface 142, and two ferrule supporting members 144. The tool 130 has a bend in the handle 132 to allow easy access to the ferrule 14 when a receptacle is mounted on a printed circuit board or in some other way that makes access to the ferrule 14 difficult. While the handle 132 is angled upwards, it could also be angled downwards or even sideways, depending on the environment in which it will be used. The tool 132 has two ferrule supporting members 144 on the bottom, which are configured to access openings 64,66 in receptacle 60. While the ferrule supporting members 144 are generally L-shaped in cross section, they could be of any shape or configuration as long as they provide support to the ferrule 14 and could access the openings 64,66. Optical fiber opening 134 is preferably a recessed portion in the bottom side of the tool 130. Being a recessed portion, the tool 130 will not interfere with or cause damage to the optical fibers 16 during use: However, it is also possible that at least a portion the optical fiber opening 134 were configured as a passageway as in the first two tools 80,110. Similarly, while the optical fiber opening 134 is shown to extend along the length of the handle 132 (see FIG. 17), it could only extend for a portion of the tool 130, most reasonably at the distal end 146 where the optical fibers 16 are more likely to be engaged by the tool 130.

The use of the tool 130 is similar to the use of the other tools 80,110. The use of the tool 130 can best be described with reference to FIGS. 16 and 17. In FIG. 16, the ferrule 14 is being held by the tool 130 as it is either being inserted or removed from the receptacle 60. In FIG. 17, the tool has engaged the receptacle 60 and the ferrule 14. The ferrule engagement portion 136 has been aligned with and engaged opening 62 while the two latch disengagement portions 140 have engaged securing members 69. Similarly, the ferrule supporting members 144 have engaged openings 64,66 to provide support to the ferrule 14. If the tool is being used to insert the ferrule 14 into the receptacle 60, then the user would only have to push down slightly on the tool 130 to release the ferrule 14 from the projection 138 on ferrule engagement portion 136 and remove the tool 130 while leaving the ferrule 14 in the receptacle 60.

It will be apparent to those skilled in the art that various modifications and variations can be made in the receptacle of the present invention without departing from the spirit or scope of the invention. Thus, it is intended that the present invention cover the modifications and variations of this invention provided they come within the scope of the appended claims and their equivalents.

We claim:

1. A tool for removing a ferrule from a receptacle comprising:

a handle portion having a distal end and a proximal end;

a ferrule engagement portion disposed at the distal end of the handle portion; and a latch disengagement portion disposed at the distal end of the handle portion.

2. The tool according to claim 1, further comprising an optical fiber opening extending at least partially between the proximal and distal ends of the handle portion.

3. The tool according to claim 1, further comprising at least one ferrule supporting member disposed at the distal end and on a side opposing the ferrule engagement portion.

4. The tool according to claim 3, wherein the at least one ferrule supporting member comprises at least one surface configured to engage at least a portion of a ferrule body.

5. The tool according to claim 3, wherein the at least one ferrule supporting member comprises at least two surfaces configured to engage at least a portion of a ferrule body.

6. The tool according to claim 1, wherein the ferrule engagement member comprises an elongated member having at least one projection to engage a portion of a ferrule.

7. The tool according to claim 1, wherein at least a portion of the handle portion is angled relative to another portion of the handle portion.

8. The tool according to claim 2, wherein the optical fiber opening is a recessed portion along one side of the tool.

9. The tool according to claim 2, wherein the optical fiber opening is a passageway along at least a portion of handle portion.

10. The tool according to claim 1, wherein the latch disengagement portion comprises at least one elongated member, the elongate member having an engagement surface configured to engage a latch on a ferrule receptacle.

11. The tool according to claim 1, wherein the latch disengagement portion comprises at least two elongated members disposed on opposing sides of the fool, the at least two elongated members having an engagement surface to engage a corresponding latch on a ferrule receptacle.

12. The tool according to claim 10, wherein tool has a longitudinal axis and the engagement surface generally slopes inward toward the longitudinal axis.

13. The tool according to claim 1, wherein the ferrule engagement portion is disposed forward on the tool relative to the latch disengagement portion.

14. A tool for removing a ferrule from a receptacle comprising:
    a handle portion having a distal end and a proximal end;
    a ferrule engagement portion disposed at the distal end of the handle portion;
    a latch disengagement portion disposed at the distal end of the handle portion; and
    an optical fiber opening extending at least partially between the proximal and distal ends of the handle portion.

15. A tool for removing a ferrule from a receptacle, the tool defining a longitudinal axis and comprising:
    a handle portion having a distal end and a proximal end;
    a ferrule engagement portion disposed at the distal end of the handle portion and defining a plane substantially parallel to the longitudinal axis;
    a latch disengagement portion disposed at the distal end of the handle portion and defining a plane substantially parallel to the longitudinal axis and not parallel to the plane defined by the ferrule engagement portion.

16. A tool according to claim 15 further comprising an optical fiber opening extending at least partially between the distal end and the proximal end of the handle portion.

* * * * *

UNITED STATES PATENT AND TRADEMARK OFFICE
CERTIFICATE OF CORRECTION

PATENT NO. : 6,785,460 B2
DATED : August 31, 2004
INVENTOR(S) : Micahe deJong, Stuart R. Melton and Charles A. Yow, Jr.

It is certified that error appears in the above-identified patent and that said Letters Patent is hereby corrected as shown below:

Column 7,
Line 30, delete "feel" and substitute -- tool --.

Signed and Sealed this

First Day of February, 2005

JON W. DUDAS
*Director of the United States Patent and Trademark Office*